(12) United States Patent
Sata (10) Patent No.: US 7,976,661 B2
(45) Date of Patent: Jul. 12, 2011

(54) BEAD MEMBER FORMING METHOD AND APPARATUS

(75) Inventor: Yoshiyuki Sata, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 996 days.

(21) Appl. No.: 11/597,405

(22) PCT Filed: May 17, 2005

(86) PCT No.: PCT/JP2005/008977
§ 371 (c)(1),
(2), (4) Date: Jul. 17, 2007

(87) PCT Pub. No.: WO2005/115731
PCT Pub. Date: Dec. 8, 2005

(65) Prior Publication Data
US 2008/0066851 A1 Mar. 20, 2008

(30) Foreign Application Priority Data

May 28, 2004 (JP) ................................. 2004-158723

(51) Int. Cl.
*B29D 30/48* (2006.01)
(52) U.S. Cl. .......................... 156/136; 156/422; 245/1.5
(58) Field of Classification Search .................. 156/136, 156/422; 245/1.5
See application file for complete search history.

(56) References Cited

U.S. PATENT DOCUMENTS

| 1,821,161 | A | * | 9/1931 | Humphrey | 156/422 |
| 3,051,221 | A | * | 8/1962 | Strozewski | 156/422 |
| 3,741,262 | A | * | 6/1973 | Bell et al. | 156/422 |
| 3,881,526 | A | | 5/1975 | Bell et al. | |
| 4,496,411 | A | | 1/1985 | Davies et al. | |
| 5,141,033 | A | * | 8/1992 | Rausch | 140/88 |
| 5,603,799 | A | | 2/1997 | Kolb et al. | |
| 6,228,198 | B1 | * | 5/2001 | Powell | 156/136 |

FOREIGN PATENT DOCUMENTS

| JP | A-09-267410 | 10/1997 |
| JP | A-10-086241 | 4/1998 |
| JP | A-2000-334858 | 12/2000 |

* cited by examiner

*Primary Examiner* — Geoffrey L Knable
(74) *Attorney, Agent, or Firm* — Oliff & Berridge, PLLC (57) ABSTRACT

A method and an apparatus for forming bead members (D), capable of improving the working efficiency by allowing switching to the bead members with different widths in short a time. The apparatus includes sector segments (24) having first sidewalls (61-64) of bead member forming grooves (72, 73), and arcuate members (51) arranged on the outer side of the sector segments (24), and having second sidewalls (68-71) of the bead member forming grooves (72, 73). The arcuate members (51) are axially moved by a changing means, to change the distance between the first sidewalls (61-64) and the second sidewalls (68-71) of the bead member forming grooves (72, 73). Thus, when bead members (D) of a different width (winding turns of bead element S) are to be formed, the width of the of the bead members bead member forming grooves (72, 73) can be changed easily, without requiring replacement of the sector segments (24).

8 Claims, 6 Drawing Sheets

BEAD MEMBER FORMING METHOD AND APPARATUS

TECHNICAL FIELD

The present invention relates to a method and an apparatus for forming bead members, which are capable of forming bead members with different widths.

BACKGROUND ART

Conventional method and apparatus for forming bead members are disclosed, for example, in Japanese Patent Application Laid-open Publication No. 10-86241. This known system includes a forming ring assembly of generally annular shape as a whole, which is divided in the width direction into a plurality of forming rings having in the outer periphery annular grooves for forming bead members of different kinds, wherein the forming rings are connected to each other maintaining a coaxial relationship. The known system further includes an expansion means for synchronously causing a radial movement of a plurality of segments of each forming ring, to thereby cause radial expansion and contraction of the forming ring assembly. In this instance, bead members of a predetermined kind are formed by spirally winding a bead element multiple times in the annular groove of a selected forming ring.

When it is intended to form bead members of a kind which cannot be formed by the currently assembled forming rings, i.e., bead members with different diameter or width, the current forming rings are replaced by corresponding forming rings, and the bead element is supplied to the annular groove while rotating the forming ring assembly, so that the bead element is spirally wound in the annular groove to form the bead members of the desired kind.

DISCLOSURE OF THE INVENTION

Task to be Solved by the Invention

However, with the conventional bead member forming method and apparatus, as explained above, when it is intended to form bead members having a width which cannot be formed by the currently assembled forming rings, the current forming rings are replaced by corresponding forming rigs. Accordingly, there is a problem that considerable time and labor required for the replacement work result in degradation of the working efficiency.

It is therefore an object of the present invention to provide a method and an apparatus for forming bead members, which allows the switching work for bead members of different widths to be performed easily and in short a time, and which thus improves the working efficiency.

Means for Solving the Task

To this end, a first aspect of the present invention resides in a bead member forming method comprising the steps of: providing a plurality of sector segments which are arranged about a main shaft as being spaced from each other in a circumferential direction and having an outer periphery with a first sidewall of a bead member forming groove, and arcuate members supported axially movably on an outer side of the sector segments, respectively, and having an outer periphery with a second sidewall of the bead member forming groove; causing an axial movement of the arcuate members relative to the sector segments by changing means, to thereby change and determine a width of the bead member forming groove; causing an inter rotation of the main shaft, sector segments and arcuate members while simultaneously supplying a bead element to said bead member forming groove and spirally winding the bead element multiple times to form a bead member; and removing from said bead member forming groove the bead member which has been formed.

A second aspect of the present invention resides in a bead member forming apparatus comprising: a main shaft rotatable about a center axis; a plurality of sector segments arranged about the main shaft as being spaced in a circumferential direction and having an outer periphery formed with a first sidewall of a bead member forming groove; actuator means for causing synchronous movement of the sector segments in radial directions, arcuate members supported axially movably on an outer side of the sector segments, respectively, and having an outer periphery formed with a second sidewall of the bead member forming groove; and changing means for axially moving the arcuate members relative to the sector segments, thereby changing a width of the bead member forming groove; whereby a bead member is formed by causing an integral rotation of the main shaft, sector segments and arcuate members while simultaneously supplying a bead element to said bead member forming groove and spirally winding the bead element multiple times.

EFFECTS OF THE INVENTION

According to the present invention, a plurality of sector segments provided with a first sidewall of the bead member forming groove support on their outer side arcuate members provided with a second sidewall of the bead member forming groove, and these arcuate members are moved axially by the changing means to change the distance between the first and second sidewalls. Therefore, when there is a change in the width of the bead member to be formed (i.e., the winding number of the bead element), the width of the bead member forming groove can be easily changed without requiring replacement of the sector segments. Accordingly, it is possible to perform the switching work for the bead members of different widths easily and in short a time, thereby improving the working efficiency.

The structure according to an embodiment of the present invention makes it possible to easily form a plurality of kinds of bead members with different diameters simply by changing the positions of the sector segments and arcuate members by the actuator means.

The structure according to an embodiment of the present invention makes it possible to simultaneously form a pair of bead members easily, which are required for producing a pneumatic tire.

With the structure according to an embodiment of the present invention even the bead members of considerably different diameters can be formed easily, without requiring replacement of the sector segments and arcuate members.

The structure according to an embodiment of the present invention ensures that the arcuate members can be moved highly precisely notwithstanding the simplified arrangement.

BRIEF DESCRIPTION OF THE INVENTION

BEST MODE FOR CARRYING OUT THE INVENTION

Figure 1:
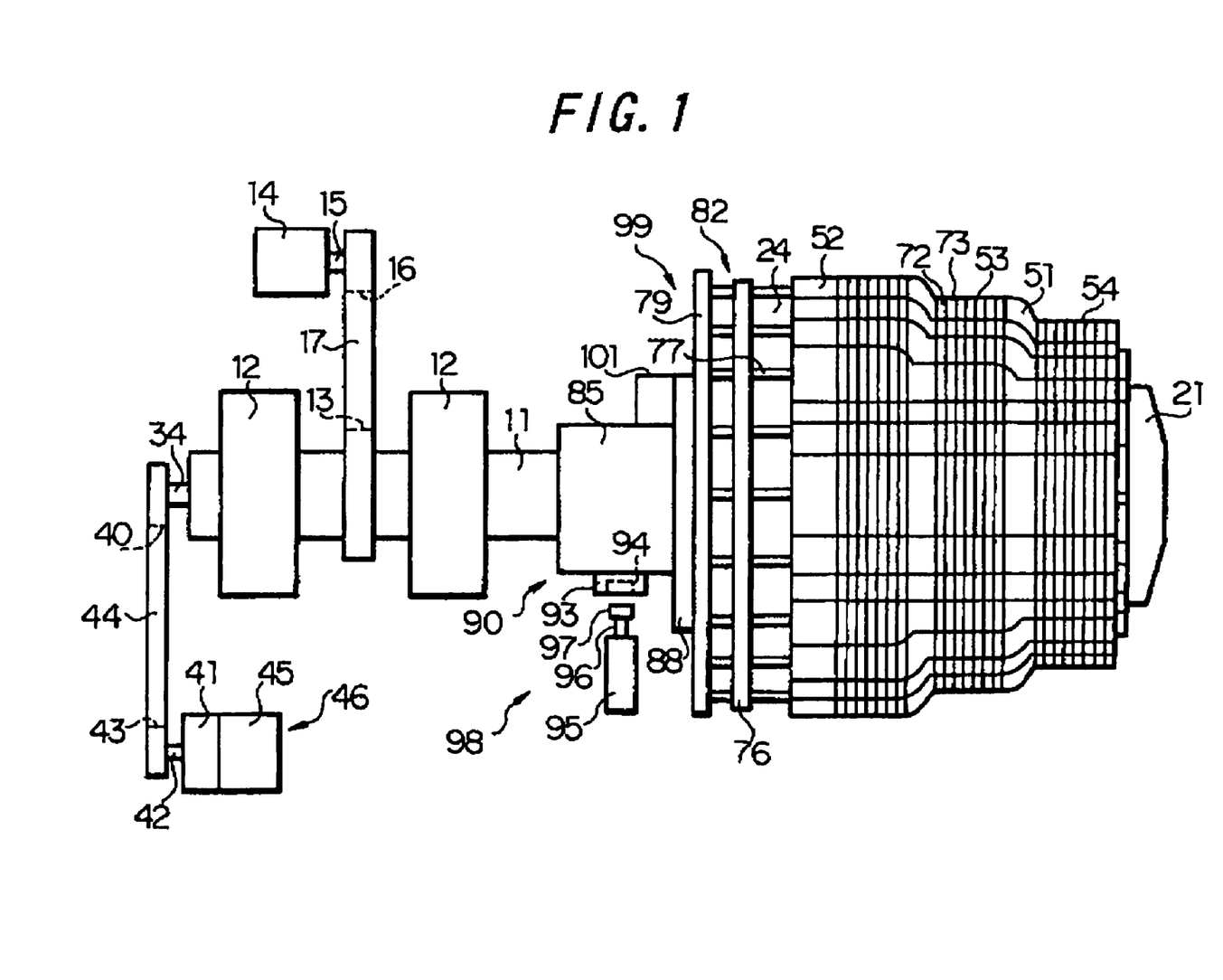
FIG. 1 is a schematic plan view showing an embodiment of the present invention.
Figure 2:
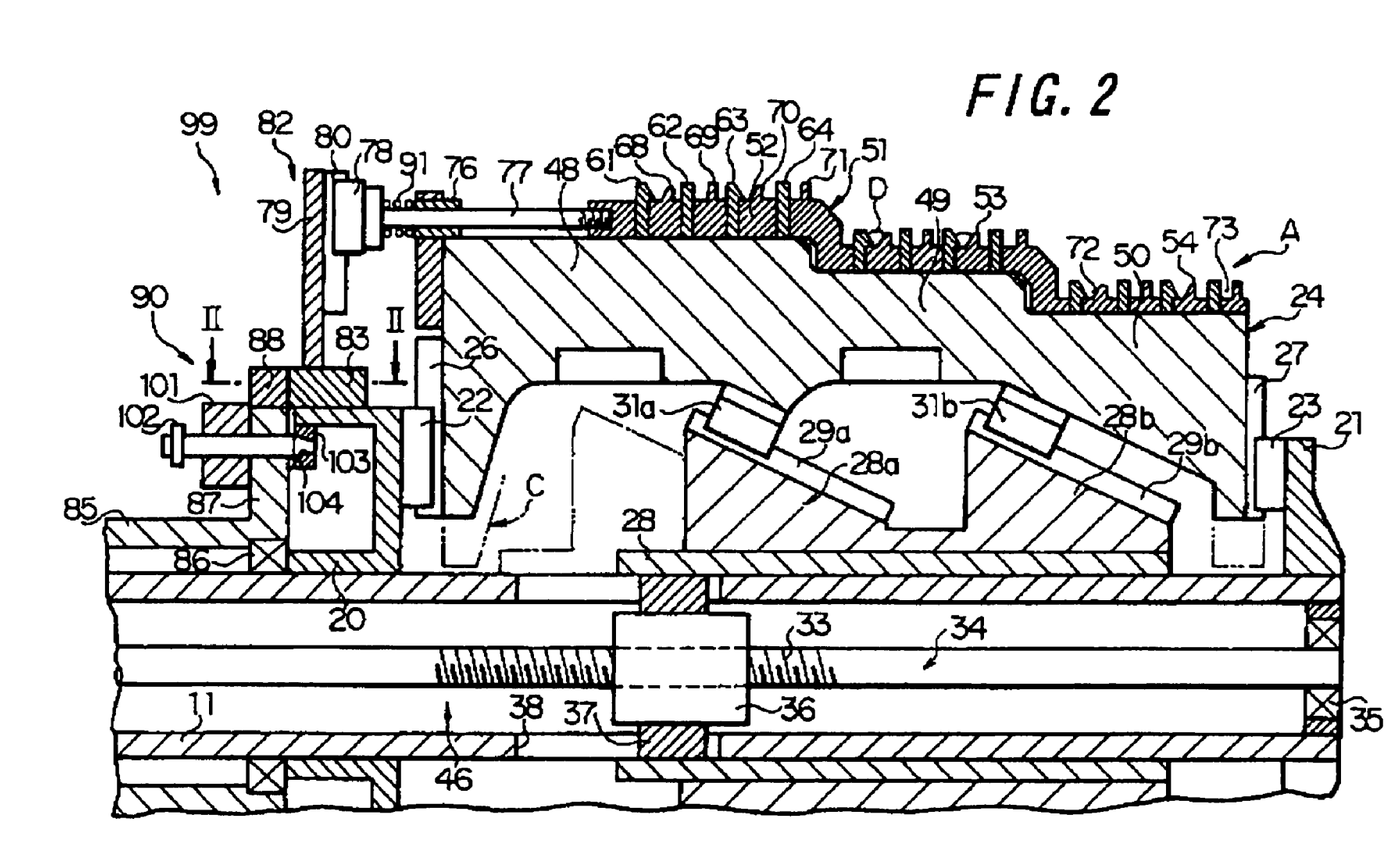
FIG. 2 is a sectional view, as seen from the front side, showing the sector segments and associated components.

The present invention will be described below with reference to a specific embodiment shown in the drawings. In FIGS. 1 and 2, reference numeral 11 denotes a horizontal, hollow cylindrical main shaft, having a proximal end supported by a plurality of bearings 12 secured to a stationary frame, not shown, so as to be rotatable about its center axis. Reference numeral 13 denotes a cog belt pulley that is fixedly secured to the proximal end of the main shaft 11, and reference numeral 14 denotes a driving means in the form of a driving motor that is supported by the stationary frame. A cog belt 17 extends between the cog belt pulley 13 and a cog belt pulley 16 that is fixedly secured to an output shaft 15 of the driving motor 14. Thus, whenever necessary, the driving motor 14 can be actuated to apply a rotational driving force to the main shaft 11, thereby causing rotation of the main shaft 11 about its center axis.

On the outer periphery of the main shaft 11 at its axially center portion and distal end, there are provided a center holder 20 and an end holder 21, respectively. The center holder 20 and the end holder 21 have axially inner surfaces, which are opposed to each other. The axially inner surfaces of the center holder 20 and the end holder 21 in their radially outer regions are provided with a plurality of slide bearings 22, 23, respectively, e.g., sixteen in number, which are spaced from each other in the circumferential direction by a same angular distance. Reference numeral 24 denotes a plurality of sector segments (same in number as the slide bearings 22, 23), which are arranged about the main shaft between the center holder 20 and the end holder 21 as being spaced in the circumferential direction by a same angular distance. These sector segments 24 are spaced from the center axis of the main shaft 11 by a same distance in the radial direction so that the sector segments as a whole exhibit a cylindrical shape.

Each sector segment 24 has axially outer side surfaces opposed to the axially inner surface of the center holder 20 and the end holder 21. The axially outer side surfaces of the sector segments 24 are provided with radially extending guide rails 26, 27, which are in sliding engagement with the slide bearings 22, 23 of the center holder 20 and the end holder 21. Thus, the sector segments 24 can be moved in the radial direction as being guided by the guide rails 26, 27 and the slide bearing 22, 23. Reference numeral 28 denotes a substantially cylindrical slider, which is fitted over the outer periphery of the main shaft 11 so as to be movable in the axial direction between the center holder 20 and the end holder 21. The slider 28 is provided with a pair of conical portions 28a, 28b of frusto-conical shape, which are spaced from each other in the axial direction.

These conical portions 28a, 28b are tapered so as to diminish toward the distal end, and are provided with a plurality of guide rails 29a, 29b (same in number as the sector segments 24), which are spaced in the circumferential direction by a same angular distance. These guide rails 29a, 29b are straight in a plane including the center axis of the main shaft 11 so that they extend linearly toward the axial distal side and toward the radially inner side.

Each sector segment 24 has an inner periphery, to which two slide bearings 31a, 31b are fixedly secured as being spaced from each other in the axial direction. These slide beings 31a, 31b are in sliding engagement with the guide rails 29a, 29b. Thus, when the slider 28 is moved in the axial direction, the sector segments 24 are guided by the guide rails 29a, 29b and the slide bearings 31a, 31b are synchronously moved in the same radial direction by the same distance, so as to undergo a radial expansion or contraction.

Reference numeral 34 denotes a ball screw shaft, which is fitted within the main shaft 11 coaxially thereto. The ball screw shaft 34 is supported by a plurality of bearings 35 so as to be rotatable relative to the main shaft 11, and has an axially center portion with an outer periphery, which is provided with a male screw 33 that is threadedly engaged with a cylindrical screw block 36 accommodated within the main body 11. Reference numeral 37 denotes a plurality of connector members for connecting the slider 28 and the screw block 36 with each other. These connector members 37 extend through a plurality of longitudinal slots 38 that are formed in the main shaft 11. Thus, when the ball screw shaft 34 to cause an axial movement of the screw block 36, the slider 28 is caused to move in the axial direction integrally with the screw block 36.

Reference numeral 40 denotes a cog belt pulley that is fixedly secured to a proximal end of the ball screw shaft 34, which projects from the proximal end of the main shaft 11. A cog belt 44 extends between the cog belt pulley 40 and a cog belt pulley 43 that is fixedly secured to an output shaft 42 of a differential reduction device 41, which is supplied with a rotational driving force from a driving motor 45. The differential reduction device 41 and the driving motor 45 are secured to the stationary frame explained above.

Figure 6:
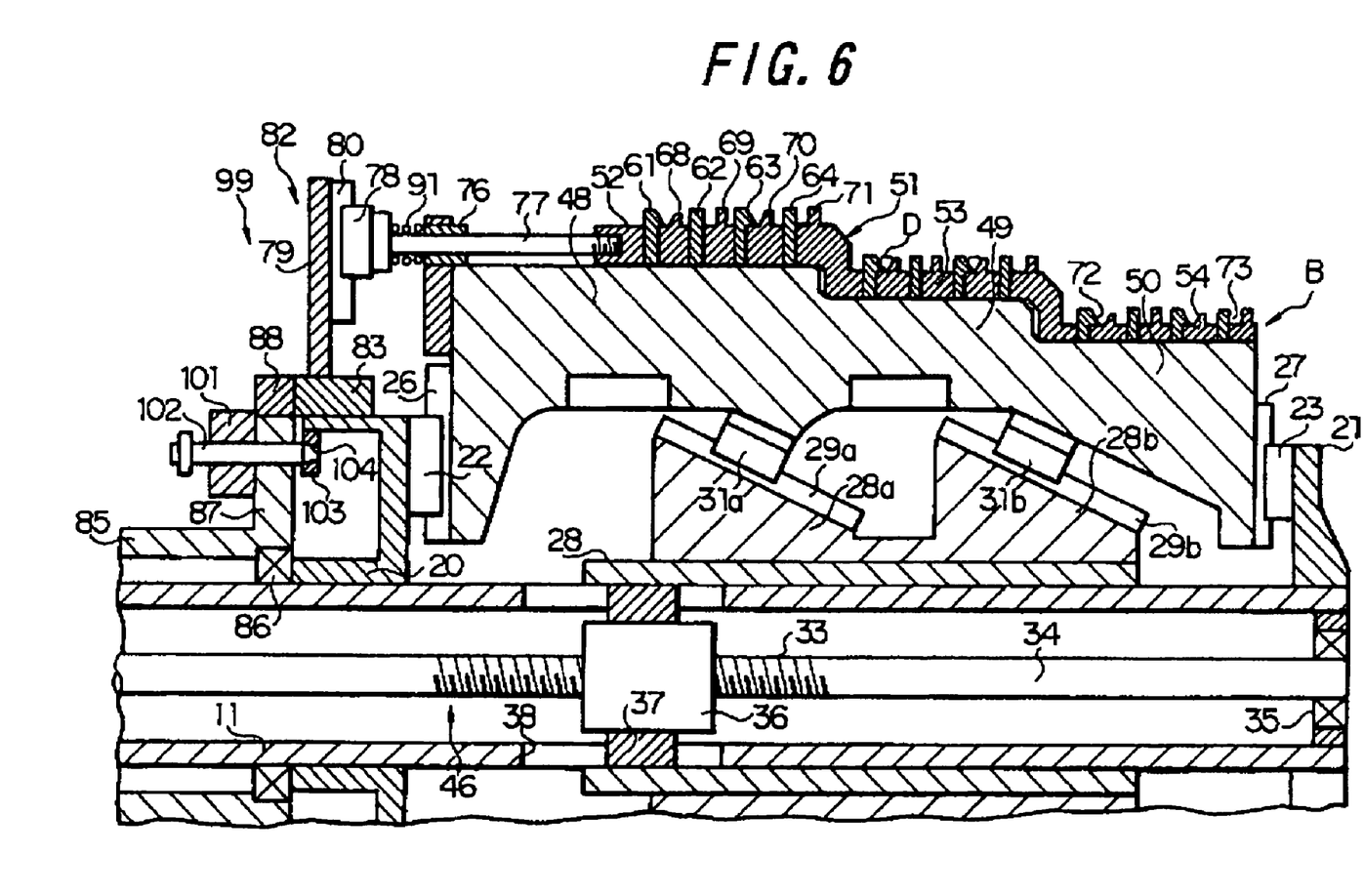
FIG. 6 is a sectional view, as seen from the front side, which is similar to FIG. 2 but shows that the sector segments assume a second radially outer position.

Whenever necessary, the driving motor 45 is operated or stopped with the rotation of the main shaft 11 stopped, so as to operate or stop the ball screw shaft 34 and thereby move the sector segments 24 in the radial direction and position them at a plurality of radially outer positions which are different from each other, e.g., at two radially outer positions including a first radially outer position A as shown by solid line in FIG. 2 and a second radially outer potion B as shown by solid line in FIG. 6, and stop the sector segments 24 at a radially inner position C as shown by imaginary line in FIG. 2.

The driving motor 45 is operated synchronously with the driving motor 14 while the main shaft 11 is rotated by the operation of the driving motor 14, so as to rotate the ball screw shaft 34 in the same direction and at the same rotational speed, in order to prevent relative rotation of the ball screw shaft 34 to the main shaft and prevent the radial movement of the sector segments 24. The above-mentioned slider 28, guide rails 29a, 29b, slide bearings 31a, 31b, ball screw shaft 34, screw block 36, connector members 37, cog belt pulley 40, differential reduction device 41, cog belt pulley 44 and driving motor 45, as a whole, constitute an actuator means 46 for integrally moving the sector segments 24 and arcuate members (to be described hereinafter) in the radial direction.

Each sector segment comprises a plurality of diameter portions, e.g., three diameter portions including a large diameter portion 48, intermediate diameter portion 49 and small diameter portion 50, which are arranged in a sequence of the large diameter portion 48, intermediate diameter portion 49 and small diameter portion 50, from the proximal end side toward the distal end side. Referee numeral 51 denotes arcuate members comprising plate members that are bent to have an arcuate shape, each being supported on the outer side of the corresponding sector segment so as to be movable in the axial direction. The arcuate member 51 has a circumferential length that is substantially the same as the circumferential length of the sector segment 24 at its outer periphery.

Similar to the sector segments 24, each arcuate member 51 comprises a plurality of diameter portions, e.g., three diameter portions including a large diameter portion 52, intermediate diameter portion 53 and small diameter portion 54, which are arranged in the stated sequence from the proximal end side toward the distal end side, so that the inner peripheries of the large diameter portion 52, intermediate diameter portion 53 and small diameter portion 54 are in surface contact with the outer peripheries of the large diameter portion 48, intermediate diameter portion 49 and small diameter portion 50 of the sector segments 24, respectively.

Figure 3:
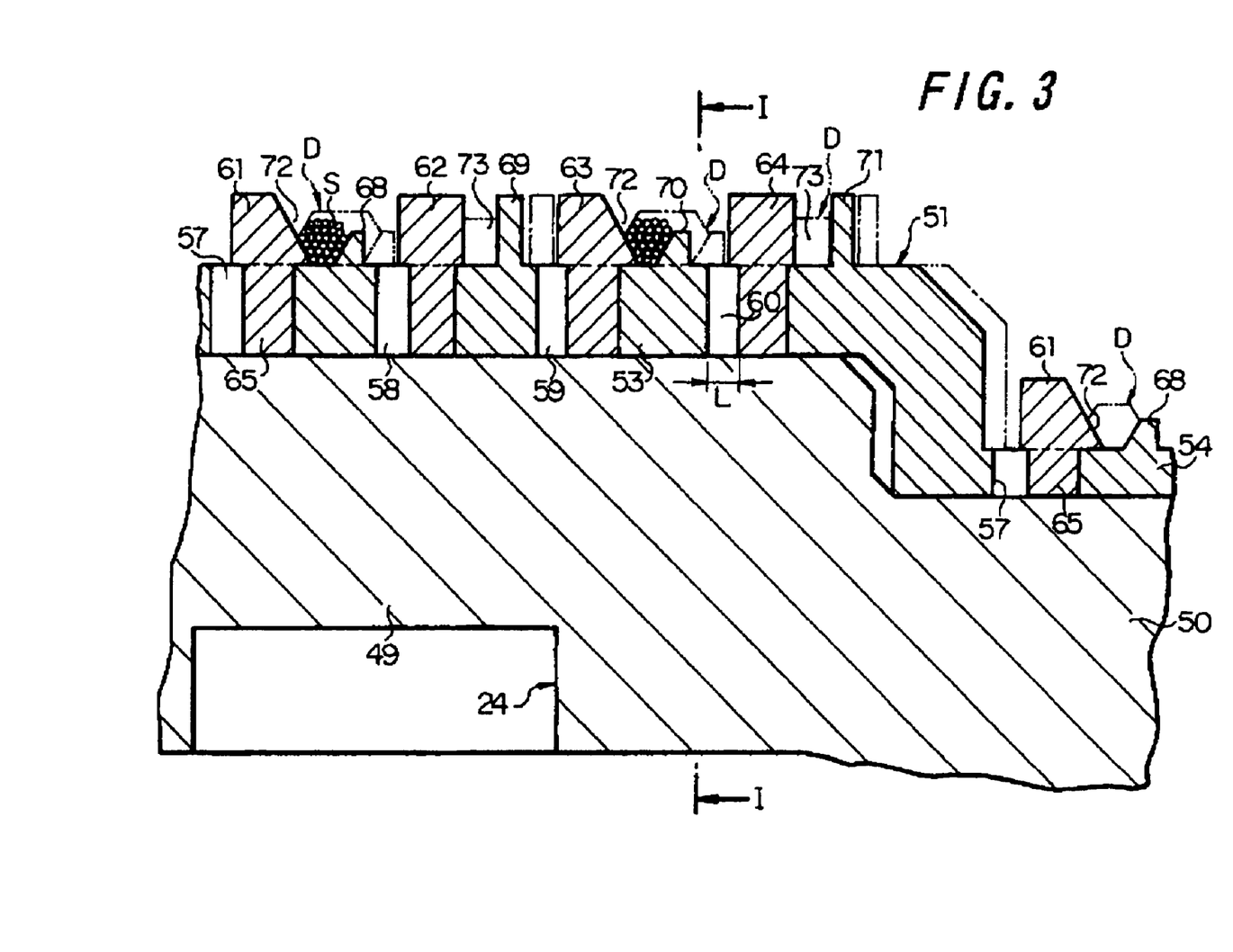
FIG. 3 is a sectional view, as seen from the front side in enlarged scale, showing the bead member forming grooves.
Figure 4:
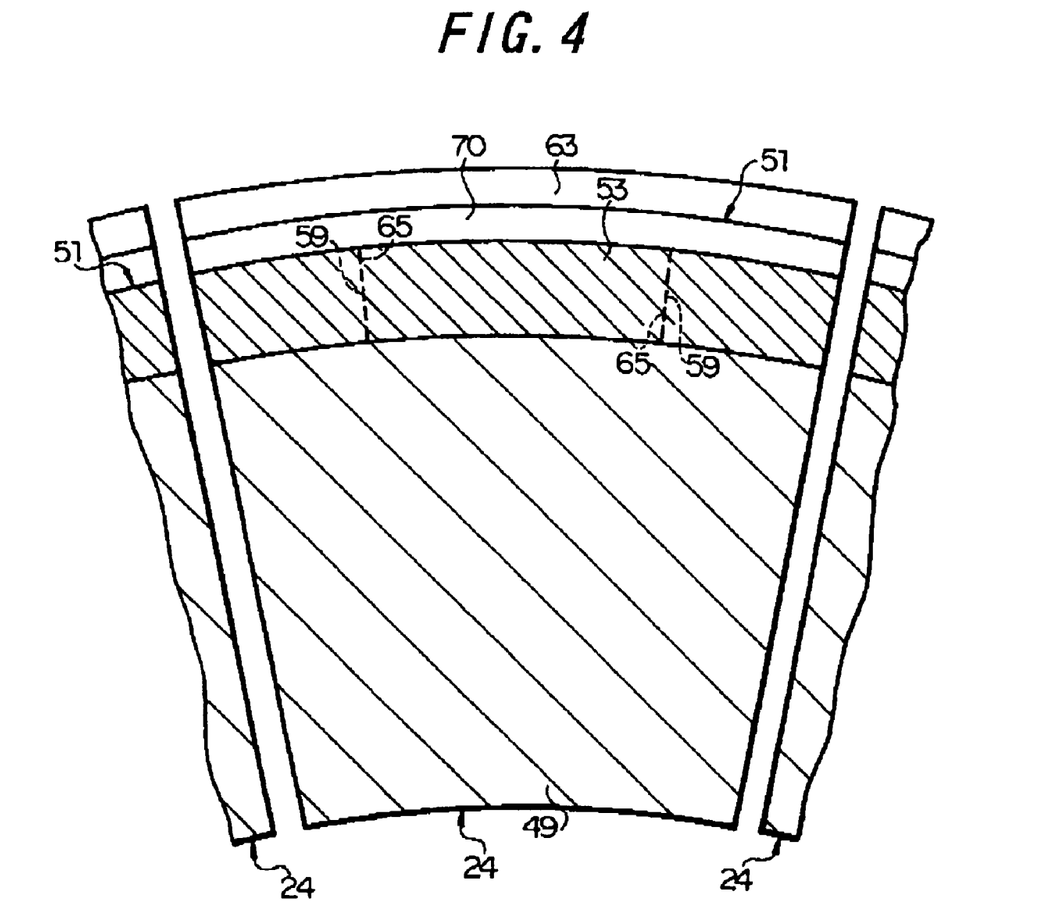
FIG. 4 is a sectional view as seen in the direction of arrow I-I in FIG. 3.

As shown in FIGS. 2, 3 and 4, the large diameter portion 52, intermediate diameter portion 53 and small diameter portion 54 of the arcuate member 51 each has a plurality of pairs of rectangular grooves in both circumferential end portions, e.g., four pairs of rectangular grooves 57, 58, 59, 60, which are spaced from each other in the axial direction. Reference numerals 61, 62, 63, 64 denote arcuate first sidewalls, each provided with a pair of fixation legs 65 projecting radially inwards from the inner periphery of the first sidewall 61, 62, 63, 64 at the circumferential end portions thereof.

The first sidewall 61, 62, 63, 64 are fixedly secured to the outer periphery of the sector segment 24 with their fixation legs 65 inserted into the rear grooves 57, 58, 59, 60 in the large diameter portion 52, intermediate diameter portion 53 and small diameter portion 54 of the arcuate member 51. By this, the outer periphery of the sector segment 24, i.e., the outer periphery of each of the large diameter portion 52, intermediate diameter portion 53 and small diameter portion 54, has arcuate first sidewalls of the bead member forming groove (i.e., the first sidewalls 61, 62, 63, 64). Each fixation leg 65 has a thickness measured in the axial direction, which is smaller than the width of the rectangular grooves 57, 58, 59, 60 measured in the axial direction, by a distance L, so that the arcuate members 51 can be moved in the axial direction by an amount which corresponds to the distance L.

The first sidewall 61, 63 have side surfaces facing the distal end side, and these side surfaces are inclined radially inwards and toward the distal end side. Thus, these first sidewalls 61, 63 are used for forming flat bead members having a hexagonal cross-section. The first sidewalls 62, 64 have side surfaces facing the distal end side, and these side surfaces extend in the radial direction. Thus, the first sidewalls 62, 64 are used for forming bead members having a rectangular section.

The outer periphery of each of the large diameter portion 52, intermediate diameter portion 53 and small diameter portion 54, has arcuate second sidewalls 68, 69, 70, 71 of the bead member forming groove, respectively. The second sidewalls 68, 69, 70, 71 are arranged on the proximal end side of the corresponding first sidewalls 61, 62, 63, 64 and spaced therefrom by a small stance. The second sidewalls 68, 70 have side surfaces facing the proximal end side, and these side surfaces are inclined radially inwards and toward the proximal end side. Thus, these second sidewalls 68, 70 define, together with the first sidewalls 61, 63 and the outer periphery of the arcuate member 51 between these sidewalls, a pair of bead member forming grooves 72 for forming flat bead members having a hexagonal cross-section.

The second sidewalls 69, 71 have side surfaces facing the proximal end side, and these side surfaces extend in the radial direction. Thus, these second sidewalls 69, 71 define, together with the corresponding first sidewalls 62, 64 and the outer periphery of the arcuate member 51 between these sidewalls, a pair of bead member forming grooves 73 for forming bead members having a rectangular cross-section. In this way, the sector segments 24 and the arcuate members 51 are each comprised of a plurality of different diameter portions, i.e., the large diameter portion 48, intermediate diameter portion 49 and small diameter portion 50 for the sector segments 24, and the large diameter portion 52, intermediate diameter portion 53 and small diameter portion 54 for the arcuate member 51, and each diameter portion is provided with the bead member forming groves 72, 73 for forming the bead members D. Therefore, even the bead members of considerably different diameters can be easily formed without requiring replacement of the sector segments 24 and arcuate members 51.

Furthermore, as explained above, the large diameter portion 48, intermediate diameter portion 49 and small diameter portion 50 of the sector segments 24, and the large diameter portion 52, intermediate diameter portion 53 and small diameter portion 54 of the arcuate member 51 are each provided with at least one pair of first sidewalls 61, 63 and second sidewalls 68, 70 for forming the bead members of hexagonal cross-section as being spaced from each other in the axial direction, and at least one pair of first sidewalls 62, 64 and second sidewalls 69, 71 for forming bead members of rectangular cross-section as being spaced from each other in the axial direction. It is thus possible to easily and simultaneously form the bead members of hexagonal cross-section and bead members of rectangular cross-section, constituting respective pairs as required in the production of a pneumatic tire.

Moreover, as explained above, the actuator means 46 is operated to move the sector segments 24 and the arcuate members 51 into a plurality of radially outer positions which are different from each other, i.e., the first and second radially outer positions A and B in the illustrated embodiment, and to form the bead members D in each of the radially outer positions (the first and second radially outer positions A and B). Thus, it is possible to easily form plural kinds of bead members D which are different in diameter from each other, at each of the large diameter portion 48, 52, intermediate diameter portion 49, 53 and small diameter portion 50, 54, simply by changing their positions.

For example, in the illustrated embodiment, when the sector segments 24 and the arcuate members 51 assume the first radially outer position A, the bead member forming grooves 72, 73 in the large diameter portions 48, 52 form bead members D of 20 inches, the bead member forming grooves 72, 73 in the intermediate diameter portions 49, 52 form bead members D of 18 inches, and the bead member forming grooves 72, 73 in the small diameter portions 50, 54 form bead members D of 16 inches. Similarly, when the sector segments 24 and the arcuate members 51 assume the second radially outer position B, the bead member forming grooves 72, 73 in the large diameter portions 48, 52 form bead members D of 19 inches, the bead member forming grooves 72, 73 in the intermediate diameter portions 49, 52 form bead members D of 17 inches, and the bead member forming grooves 72, 73 in the small diameter portions 50, 54 form bead members D of 15 inches. In this way, it is possible to simply and easily form pairs of the bead members D of multiple sizes, having different cross-sectional shapes.

Figure 5:
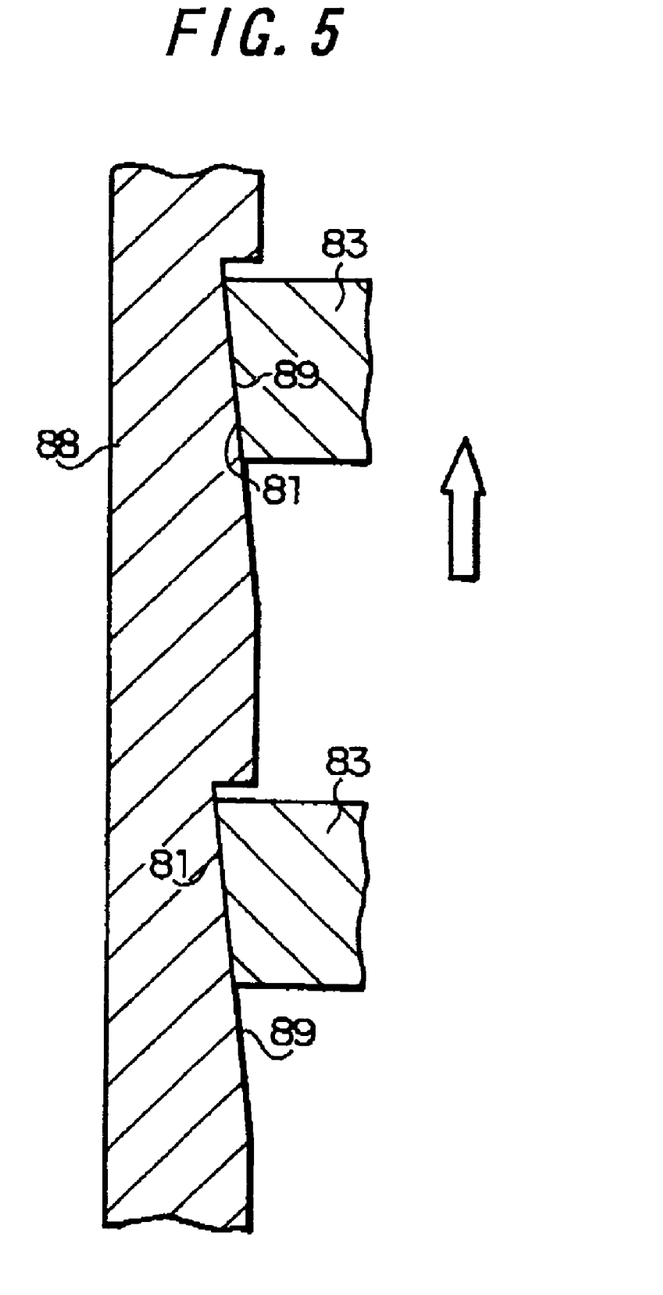
FIG. 5 is a sectional development view as seen in the direction of arrow II-II in FIG. 2.

In FIGS. 1, 2 and 5, reference numeral 76 denotes a carrier, which is secured to the outer periphery of the sector segments 24 at their proximal ends. Axially extending connecting rods 77 are inserted into the carrier 76, with their center portions slidably received by the carrier 76. Each connecting rod 77 has a distal end that is connected to the proximal end of the corresponding arcuate member 51, and a proximal end where a slide bearing 78 is fixedly secured. Reference numeral 79 denotes a transmission plate in the form of a collar, which is arranged adjacent to the proximal end side of the slide bearing 78 coaxially to the shaft 11. The transmission plate 79 has an end surface provided with a plurality of radial guide rails 80 (same in number as the slide rails 78), which are spaced from each other in the circumferential direction, by the same angular distance, and which are in sliding engagement with the respective slide rails 78.

The transmission plate 79 has an inner periphery, to which a plurality of arcuate inclined members 83 are fixedly secured as being spaced from each other in the circumferential direction, by the same angular distance. Each inclined member 83 has an inner periphery, which is in sliding engagement with the outer periphery of the center holder 20, and an axial end surface, i.e., the end surface facing the proximal end in the illustrated embodiment, which is in the form of an inclined surface slightly inclined relative to the circumferential direction, toward one side in the circumferential direction (in the direction of arrow in FIG. 5), while approaching the proximal end side. The above-mentioned connecting rods 77, slide bearings 78, transmission plate 79, guide rails 80 and inclined members 83, as a whole, constitute a moving body 82 connected to each arcuate members 51 so as to be integrally movable therewith, in the axial direction, and having an axial end surface that is slightly inclined relative to the circumferential direction.

Reference numeral 85 denotes a rotary member that is fitted on the outer side of the main shaft 11, and rotatably supported by the main shaft 11 through a bearing 86. The rotary member 85 is arranged on the proximal end side of the center holder 20. The rotary member 85 has an axial end portion in the form of a flange 87, and an annular inclined ring 88 is fixedly secured to the outer periphery of the flange 87. The inclined ring 88 has an axial end surface comprised of a plurality of inclined surfaces 89, which are inclined in parallel with the above-mentioned inclined surface 81 (in the same direction and at the same angle), wherein these inclined surfaces 89 are opposed to the inclined member 83 and spaced from each other in the circumferential direction by the same angular distance. The inclined surfaces 81 of the inclined members 83 are urged by springs 91 arranged between the carrier 76 and the slide bearings 78 to surround the connecting rods 77, and maintained in surface contact with the corresponding inclined surface 89 of the inclined ring 88.

The above-mentioned rotary body 85 and the inclined ring 88, as a whole, constitute a ring member 90 rotatably supported by the main shaft 11 and having an axial end surface 89 that is inclined in parallel with the axial end surface 81 of the moving member 82 so that the axial end surface 89 is in surface contact with the axial end surface 81. Reference numeral 93 denotes a stationary block, which is fixedly secured to the outer periphery of the rotary body 85. The stationary block 93 has an outer surface that is formed with a stopper recess 94. Reference numeral 95 denotes a cylinder secured to the above-mentioned stationary fame, including a piston rod 96. The piston rod 96 has a tip end, to which a lock piece 97 is fixedly secured so as to be inserted into the stopper recess 94 as the piston rod 96 is ended.

When the piston rod 96 is extended and the lock piece 97 is inserted into the stopper recess 94, the ring body 90 is applied with a braking force and thereby stopped. The abovementioned stationary block 93, cylinder 95 and lock piece 97, as a whole, constitute a stopper mechanism 98 for applying a braking force to the ring member 90 and thereby stopping its rotation. While the rotation of the ring member 90 is being stopped by the stopper mechanism 98, the driving motor 14 may be operated to cause an integral rotation of the main shaft 11, sector segments 24, arcuate members 51 and moving body 82, and an axial movement of the moving body 82 and the arcuate members 51 under a wedge function of the of the inclined surfaces 81, 89 of the moving body 82 and the ring body 90, so as to move the second sidewalls 68, 69, 70, 71 toward and away from the first sidewalls 61, 62, 63, 64 and thereby change the widths of the bead member forming grooves 72, 73.

The above-mentioned moving body 82, ring body 90 and stopper mechanism 98, as a whole, constitute a changing means 99 for axially moving the arcuate members 51 relative to the sector segments 24, and thereby changing the widths of the bead member forming grooves 72, 73. With the changing means 99 comprised of the moving body 82, ring body 90 and stopper mechanism 98 as explained above, it is possible to easily move the arcuate members 51 in the axial direction with high precision, e.g., the precision on the order of 0.1 mm, notwithstanding a simple arrangement, making it possible to easily form the bead members D with different widths (i.e., different number of turns of the bead element S).

Reference numeral 101 denotes a pin block fixedly secured to the proximal end surface of the flange 87. An axial lock pin 102 is inserted into the pin block 101 and the flange 87 so as to be movable in the axial direction. Reference numeral 103 denotes an arcuate lock block, which is provided with a plurality of pin holes 104 that are spaced from each other in the circumferential direction. When the widths of the bead member forming grooves 72, 73 are changed as explained above, the lock pin 102 is pushed toward the distal end and inserted into one of the pin holes 104 and thereby connects the ring body 90 to the moving body 82 so as to be rotatable integrally with each other.

The operation of the apparatus explained above will be described below. It is assumed that the sector segments 24 are situated at the first radially outer position A, the arcuate members 51 have moved to the proximal end side so that the widths of the bead member forming grooves 72, 73 are small, and the lock pin is inserted into the pin hole 104 to lock the ring body 90 relative to the moving body 82. In such a state, by operating the driving motor 14 to supply the rotational driving force to the main shaft 11 through the cog belt pulley 16, cog belt 17 and cog belt pulley 13, the main shaft 11 is rotated about its center axis integrally with the sector segments 24, arcuate members 51 and changing means 90.

On this occasion, the bead element S comprised of a steel wire or monofilament is supplied to the bead member foaming grooves 72 or 73, e.g., the pair of bead member forming grooves 72 in the intermediate diameter portions 49, 53 in the illustrated embodiment, respectively, so that the bead element S is tightly wound within the bead member forming grooves 72 in a spiral manner multiple times, to simultaneously form a pair of bead members D having a hexagonal cross-section and a diameter of 18 inches.

Here, the driving motor 45 is also operated simultaneously with the operation of the driving motor 14, in order to supply the rotational driving force to the ball screw shaft 34 through the differential reduction device 41, cog belt pulley 43, cog belt 44 and cog belt pulley 40, so that the ball screw shaft 34 is caused to rotate in the same direction and at the same speed as the main shaft 11. As a result, during the winding of the bead element S, the axial position of the slider 28 relative to the main shaft 11 is maintained constant, and the sector segments 24 and the arcuate members 51 are prevented from moving in the radial direction so that the bead member D has a stable shape.

When the bead members D have been formed in the manner described above, the bead members D are clamped from outer side by means of a clamping transfer means (not shown). Then, with the rotation of the main shaft 11 stopped, the driving motor 45 is operated to rotate the ball screw shaft 34 and thereby move the screw block 36 and the slider 28 toward the proximal end side. On this occasion, since the slide bearings 31a, 31b of the sector segments 24 are in engagement with the inclined guide rails 29a, 29b, the sector segments 24 and the arcuate members 51 are synchronously moved radially inwards to the radially inner position C, where the radially outer edges of the first sidewalls 61, 62, 63, 64 and the second sidewalls 68, 69, 70, 71 are situated on the radially inner side, with reference to the inner periphery of the bead members D.

Subsequently, the bead members D formed are removed from the bead member forming grooves 72 and transferred to a next station by the clamping transfer means. The diving motors 14, 45 are then operated so that the sector segments 24 and the arcuate members 51 are returned to the first radially outer position A. The main shaft 11 is then rotated again while the bead element S is supplied to the bead member forming grooves 72 to form another pair of bead members D in the manner described above. By repeating these operations, the bead members D are successively formed.

In order to increase the width (the number of winding turns of the bead element S) of the bead members D to be formed, the lock pin 102 is moved toward the proximal end side and removed from the pin hole 1 to separate the ring body 90 from the moving body 82. The cylinder 95 of the changing means 99 is then operated to extend the piston rod 96 and engage the lock piece 97 into the stopping recess 94. By this, the cylinder 95 applied a braking force to the ring body 90 so as to lock the ring body 90. The driving motor 14 is then operated so as to cause an integral rotation of the main shaft 11, sector segments 24, arcuate members 51 and the moving body 82 and movement of the inclined members 83 in the opposite circumferential direction (opposite to the direction indicated by arrow in FIG. 5).

As a result, the arcuate members 51 are moved axially toward the distal end side, under the wedge function of the inclined surfaces 81, 89 of the moving body 82 and the ring body 90 so that the second sidewalls 68, 69, 70, 71 are separated from the first sidewalls 61, 62, 63, 64, thereby increase the distance between the second sidewalls 68, 69, 70, 71 and the first sidewalls 61, 62, 63, 64, i.e., the width of the bead member forming grooves 72, 73. In this way, the width of the bead member forming grooves 72, 73 can be changed easily, without requiring replacement of the sector segments 24, simply by moving the arcuate members 51 in the axial direction. Therefore, the switching operation into the bead members D of a different width can be achieved easily and in short a tine, so as to improve the working efficiency. Incidentally, the width of the bead member forming grooves 72, 73 can be changed in a stepwise manner, by an order of the diameter of the bead element S.

Subsequently, the lock pin 102 is moved toward the distal end side and inserted into the pin hole 104 so as to connect the ring body 90 with the main shaft 11 and the moving body 92, while retracting the piston rod 96 of the cylinder 95 to remove the lock piece 97 out of the stopping recess 94. In such a state, the main shaft 11, sector segments 24 and arcuate members 51 are rotated integrally while supplying the bead element S to the bead member forming grooves 72 in the intermediate diameter portions 49, 53 and spirally wind the bead element S within the bead member forming grooves 72 by an increased number of turns, to thereby form wider bead members D of hexagonal cross-section, as shown by imaginary lines in FIG. 3.

On the other hand, it is possible to form the bead members D having the same diameter of 18 inches and a different cross-sectional shape (rectangular cross-section), by rotating the main shaft 11 and supplying the bead element S to the bead member forming grooves 73 in the intermediate diameter portions 49, 53. The bead members D having the diameter of 20 inches and a hexagonal cross-section can be formed by rotating the main shaft 11 and supplying the bead element S to the bead member forming grooves 72 in the large diameter portions 48, 52. The bead members D having the diameter of 20 inches and a rectangular cross-section can be formed by rotating the main shaft 11 and supplying the bead element S to the bead member forming grooves 73 in the large diameter portions 48, 52.

The bead members D having the diameter of 16 inches and a hexagonal cross-section can be formed by rotating the main shaft 11 and supplying the bead element S to the bead member forming grooves 72 in the small diameter portions 50, 54. The bead members D having the diameter of 16 inches and a rectangular cross-section can be formed by rotating the main shaft 11 and supplying the bead element S to the bead member forming grooves 73 in the small diameter portions 50, 54.

Furthermore, when the bead members having the diameter of 15, 17 or 19 inches are to be formed, the driving motor 45 is operated to rotate the ball screw shaft 34 with the rotation of the main shaft 11 stopped, and thereby move the screw block 36 and the slider 28 toward the proximal end side. On this occasion, since the slide bearings 31a, 31b of the sector segments 24 are in engagement with the inclined guide rails 29a, 29b, the sector segments 24 and the arcuate members 51 are synchronously moved radially inwards. The operation of the motor 45 is stopped when the sector segments 24 and the arcuate members 51 reach the second radially outer portion B.

In such a state, by rotating the main shaft 11 while supplying and spirally winding the bead element S to selected bead member forming grooves 72, 73, bead members D having the diameter of 19 inches can be formed in the bead member forming grooves 72, 73 in the large diameter portions 48, 52, bead members D having the diameter of 17 inches can be formed in the bead member forming grooves 72, 73 in the intermediate diameter portions 49, 53, and bead members D having the diameter of 15 inches can be formed in the bead member forming grooves 72, 73 in the small diameter portions 50, 54.

In the embodiment described above, the sector segments 24 and the arcuate members 51 are moved in the radial direction by using the inclined guide rails 29a, 29b and the slide bearings 31a, 31b. However, it is also possible, according to the present invention, to cause radial movement of the sector segments 24 and the arcuate members 51 by connecting the slider 28 and the sector segments 24 by means of a parallel link mechanism, and moving the slider 28 in the axial direction to cause a tilting movement of the parallel link mechanism In the embodiment described above, furthermore, the large diameter portion 48, intermediate diameter portion 49 and small diameter portion 50 of the sector segments 24 are formed as an integral member, and the large diameter portion 52, intermediate diameter portion 53 and small diameter portion 54 of the arcuate members 51 are similarly formed as an integral member. However, it is also possible, according to the present invention, to physically divide the sector segments 24 and arcuate members 51 into three portions, respectively, which are connected to each other by a fastening mans such as bolts. In this instance, the apparatus can be adapted for the formation of bead members of increased number of types, by changing selected diameter portions, if necessary.

INDUSTRIAL APPLICABILITY

The present invention is applicable to an industrial field of production of bead members for pneumatic tires.

The invention claimed is:

1. A bead member forming method comprising the steps of:
providing a plurality of sector segments which are arranged about a main shaft as being spaced from each other in a circumferential direction and having an outer periphery with a first sidewall of a bead member forming groove, and arcuate members supported axially movably on an outer side of the sector segments, respectively, and having an outer periphery with a second sidewall of the bead member forming groove;
causing synchronous movement of the sector segments in radial directions using actuator means for causing synchronous movement of the sector segments in radial directions;
causing an axial movement of the arcuate members relative to the sector segments by changing means for axially moving the arcuate members relative to the sector segments, to thereby change and determine a width of the bead member forming groove;
causing an integral rotation of the main shaft, sector segments and arcuate members while simultaneously supplying a bead element to said bead member forming groove and spirally winding the bead element multiple times to form a bead member; and
removing from said bead member forming groove the bead member which has been formed.

2. A bead member forming apparatus comprising:
a main shaft rotatable about a center axis;
a plurality of sector segments arranged about the main shaft as being spaced in a circumferential direction and having an outer periphery formed with a first sidewall of a bead member forming groove;
actuator means for causing synchronous movement of the sector segments in radial directions;
arcuate members supported axially movably on an outer side of the sector segments, respectively, and having an outer periphery formed with a second sidewall of the bead member forming groove; and
changing means for axially moving the arcuate members relative to the sector segments, thereby changing a width of the bead member forming groove,
whereby a bead member is formed by causing an integral rotation of the main shaft, sector segments and arcuate members while simultaneously supplying a bead element to said bead member forming groove and spirally winding the bead element multiple times.

3. The bead member forming apparatus according to claim 2, wherein said actuator means is capable of positioning said sector segments and said arcuate members at a plurality of radially outer positions, and at a radially inner position for removing the bead member formed, wherein the bead members are formed at each of said radially outer positions, allowing formation of plural kinds of bead members with different diameters.

4. The bead member forming apparatus according to claim 2, wherein said sector segments and said arcuate members comprise, respectively, at least one pair of said first sidewalls spaced axially from each other and at least one pair of said second sidewalls spaced axially from each other so as to allow simultaneous formation of bead members forming a pair.

5. The bead member forming apparatus according to claim 2, wherein said sector segments and said arcuate members each comprises a plurality of diameter portions with different diameters, said plurality of diameter portions each having said bead member forming groove so as to allow formation of bead members with different diameters.

6. The bead member forming apparatus according to claim 2, wherein said changing means comprises:
a moving body connected to said arcuate members so as to be integrally movable in the axial direction, and having an axial end surface that is inclined relative to the circumferential direction;
a ring member rotatably supported by said main shaft and having an axial end surface that is inclined in parallel with said axial end surface of the moving member so that the axial end surfaces of the moving body and the ring member are in a surface contact with each other; and
a stopper mechanism for applying a braking force to the ring member and thereby stopping the rotation of the ring member,
wherein said moving body and said arcuate members are moved in the axial direction by rotating said main shaft, sector segments, arcuate members and moving body, while stopping the rotation of the ring member by said stopper mechanism.

7. The bead member forming apparatus according to claim 2, wherein said sector segments and said arcuate members include two separate grooves that have different shapes and form bead members of different shapes.

8. The bead member forming apparatus according to claim 7, wherein each of the two grooves is movably adjustable by the changing means to have different sizes.

* * * * *